US010089518B2

(12) United States Patent
Bengtsson et al.

(10) Patent No.: US 10,089,518 B2
(45) Date of Patent: Oct. 2, 2018

(54) GRAPHICAL USER INTERFACE FOR ANALYSIS OF RED BLOOD CELLS

(71) Applicant: CELLAVISION AB, Lund (SE)

(72) Inventors: Hans-Inge Bengtsson, Lund (SE); Lisbeth Palm, Staffanstorp (SE); Mats Erikson, Lund (SE); Kent Strahlen, Kavlinge (SE); Martin Almers, Lund (SE); Anna Kapferer, Obsteig Tirol (AT); Mattias Nilson, Lund (SE); Benny Klein, Bara (SE); Gert-Ola Carlsson, Tomelilla (SE)

(73) Assignee: CELLAVISION AB, Lund (SE)

( * ) Notice: Subject to any disclaimer, the term of this patent is extended or adjusted under 35 U.S.C. 154(b) by 213 days.

(21) Appl. No.: 14/888,772

(22) PCT Filed: May 2, 2014

(86) PCT No.: PCT/EP2014/058979
§ 371 (c)(1),
(2) Date: Nov. 3, 2015

(87) PCT Pub. No.: WO2014/180747
PCT Pub. Date: Nov. 13, 2014

(65) Prior Publication Data
US 2016/0078276 A1 Mar. 17, 2016

(30) Foreign Application Priority Data

May 8, 2013 (SE) ...................................... 1350568

(51) Int. Cl.
*G06K 9/00* (2006.01)
*G06K 9/62* (2006.01)
(Continued)

(52) U.S. Cl.
CPC ....... *G06K 9/00147* (2013.01); *G06F 3/0484* (2013.01); *G06K 9/00127* (2013.01);
(Continued)

(58) Field of Classification Search
None
See application file for complete search history.

(56) References Cited

U.S. PATENT DOCUMENTS 8,484,572 B2 7/2013 Yamada
2006/0050948 A1 3/2006 Sumida et al.
(Continued)

FOREIGN PATENT DOCUMENTS

CN 101762584 A 6/2010
WO 2012174542 A2 12/2012

OTHER PUBLICATIONS

PCT International Search Report for PCT International Patent Application No. PCT/EP2014/058979, dated Aug. 28, 2014.

*Primary Examiner* — Randolph I Chu
(74) *Attorney, Agent, or Firm* — Holland & Hart LLP (57) ABSTRACT

Methods and systems for generating a graphical user interface for analysis of red blood cells. The method generates a first view of the graphical user interface by highlighting red blood cells in an image that are classified into at least one group indicated by a user input. The method also generates a second view by extracting individual red blood cells being classified into the at least one group indicated by the user input from the image of red blood cells and displaying them group-wise.

15 Claims, 4 Drawing Sheets

(51) Int. Cl.
*G06F 3/0484* (2013.01)
*G06T 11/00* (2006.01)
*G06T 7/10* (2017.01)

(52) U.S. Cl.
CPC .............. *G06K 9/6253* (2013.01); *G06T 7/10* (2017.01); *G06T 11/001* (2013.01); *G06T 2200/24* (2013.01); *G06T 2207/10004* (2013.01)

(56) References Cited

U.S. PATENT DOCUMENTS

| | | |
|---|---|---|
| 2008/0008349 A1 | 1/2008 | Binnig et al. |
| 2010/0128988 A1 | 5/2010 | Kincaid |
| 2012/0147010 A1 | 6/2012 | Schmidt et al. |
| 2013/0290006 A1 | 10/2013 | Kamath et al. |

GRAPHICAL USER INTERFACE FOR ANALYSIS OF RED BLOOD CELLS

TECHNICAL FIELD

The present invention relates to the field of analysis of red blood cells. In particular it relates to a graphical user interface via which a sample of red blood cells may be analyzed.

BACKGROUND

To meet the increasing demands in health care it has become important to analyze samples of red blood cells efficiently and accurately. There exists graphical user interfaces for the analysis of images depicting samples of red blood cells.

For example, there are graphical user interfaces which show an image of a red blood cell sample on a screen. A user may then by visual inspection scan over the image in order to analyze the sample. Such graphical user interfaces give a good spatial overview of the red blood cells in the sample. However, it is difficult to analyze the individual red blood cells with respect to different properties of red blood cells, such as color, size, shape, and inclusions.

Other graphical user interfaces take another approach and extract the red blood cells from the image and present the extracted red blood cells side by side on a screen. Moreover, the extracted red blood cells may be sorted based on different properties. In this way it is possible to analyze the individual red blood cells with respect to different properties of the red blood cells in the sample. However, since the red blood cells are extracted from the image the spatial context of the red blood cells in the sample is lost. There is thus room for improvements.

SUMMARY OF THE INVENTION

In view of the above, it would thus be beneficial to have a graphical user interface that shows red blood cells both in their spatial and their contextual environment. It is thus an object of the present invention to provide an improved graphical user interface for analysis of red blood cells. In particular, it is an object to provide a graphical user interface which gives a spatial overview of red blood cells in the sample with respect to different properties at the same time as it allows analysis of individual red blood cells with respect to the different properties.

According to a first aspect of the invention, the above object is achieved by a method for generating a graphical user interface for analysis of red blood cells. The method comprises: receiving an image depicting a sample of red blood cells; receiving red blood cell data comprising, for each red blood cell in the image, a segmentation and a position of the red blood cell in the image, and a classification of the red blood cell into at least one group with respect to at least one property of red blood cells; receiving a first user input indicating at least one group into which the red blood cells in the image have been classified; generating a first view of the graphical user interface by: finding all red blood cells in the red blood cell data which are classified into the at least one group indicated by the first user input, highlighting the found red blood cells in the image, and displaying the image with highlighted red blood cells in the first view; generating a second view of the graphical user interface by, for each of the at least one group indicated by the first user input: finding all red blood cells in the red blood cell data that are classified into the group, extracting each of the red blood cells that are classified into the group from the image by extracting image data from the image falling within the segmentation of each of the red blood cells that are classified into the group, and displaying the extracted red blood cells in a sub-view of the second view that corresponds to the group.

By a segmentation of a red blood cell is meant data that defines the extent of the red blood cell. For example the segmentation may define the pixels in the image that belong to the red blood cell. The segmentation may for instance define the contour of the red blood cell or may be in the form of a mask which provides an indication of the pixels belonging to the red blood cell.

The graphical user interface generated with the above method thus comprises a first view and a second view. A user of the graphical user interface may input a selection of a particular group or particular groups of red blood cells. In the first view, the red blood cells belonging to the selected group or groups are highlighted in the image of the red blood cell sample, implying that the red blood cells of the selected group or groups are easily distinguishable in comparison to non-selected groups. In the first view the user may thus get an overview of the spatial distribution or the red blood cells in the selected group or groups. For example, the user may see if the red blood cells of the selected group or groups tend to cluster which may indicate that there is a medical condition to be diagnosed or that there was some error in the preparation of the sample. In the second view, the red blood cells of the selected group or groups are individually extracted from the image and organized group-wise. In the second view a user may thus study the red blood cells individually with respect to different properties.

Red blood cells may be associated with different properties, such as color, size, shape, and inclusions. Each property may be associated with different groups. For example the property "shape" may be associated with groups relating to cells of a first shape, cells of a second shape, and cells of a third shape. According to the invention, the first user input may indicate one or more such groups. Alternatively, or additionally, the first user input may indicate a property of red blood cells, thereby indicating all groups being associated with that property. In the above example, if the first user input indicates the property "shape", the groups relating to cells of a first, a second, and a third shape are automatically indicated. This allows a user to work with analysis of red blood cells on a group level as well as on a property level.

In case the first user input indicates more than one group, the method may further comprise: receiving, via the first or the second view, a second user input indicating a selected group of the at least one group indicated by the first user input; and, in response thereto, updating the image displayed in the sub-view of the first view to only highlight red blood cells of the selected group. In this way, a user may refine the indication of groups of the first user input into indication of a single group.

A user who works in the second view may be interested in the spatial location of one or more particular red blood cells in the sample. For this purpose the method may further comprise: receiving, via the second view, a third user input indicating one or more selected red blood cells; and in response thereto, updating the image displayed in the sub-view of the first view to only highlight the one or more selected red blood cells.

In an alternative embodiment, the method may comprise receiving a user input, via the first view, indicating one or more selected red blood cells, and in response thereto, including a graphical marking of the selected red blood cells in a sub-view of the second view.

A user who works in the second view may be interested in the spatial context of a particular red blood cell in the sample. For example, the user may be interested in having a closer look at the particular red blood cell and its surroundings. For this purpose the method may comprise: receiving, via the second view, a third user input indicating a selected red blood cell; and finding, in the red blood cell data, the position of the selected red blood cell, extracting image data from the image corresponding to an area that includes the selected red blood cell, increasing the magnification level of the extracted image data, and displaying it in a second sub-view of the second view.

A convenient way for a user to work with the analysis of red blood cells is to successively remove groups for which the analysis is completed from being highlighted in the image displayed in the first view. Once there are no highlighted groups in the image displayed in the first view, the user knows that the full analysis is completed. In order to achieve this, the method may comprise: receiving a fourth user input indicating a selected group of the at least one group indicated by the first user input for which the analysis has been completed; and in response thereto, updating the image displayed in the sub-view of the first view to remove the highlighting of the red blood cells of the selected group.

As mentioned above, the red blood cell data comprises a classification of the cells into at least one group with respect to a property. Typically the classification of the red blood cells has been made by a machine, for example by using a neural network, a support vector machine, a fuzzy logic algorithm or a k-nearest neighbour algorithm. A user analyzing the individual red blood cells in the sub-views of the second view may note that the classification of a particular cell is erroneous and may want to manually reclassify the cell. In order to enable manual reclassification, the method may comprise: receiving a fourth user input, via the second view, indicating a red blood cell to be reclassified from a first group indicated by the first user input to a second group indicated by the first user input, and for that red blood cell: updating the classification in the red blood cell data from the first group to the second group; and updating the second view to display the extracted red blood cell in the sub-view corresponding to the second group instead of in the sub-view corresponding to the first group. For example, the fourth user input may be in the form of a drag-and-drop operation where the user, for example by using a computer mouse, drags the cell to be reclassified from the sub-view corresponding to the first group and drops it in the sub-view corresponding to the second group.

Generally, a red blood cell is highlighted if its contrast in the image relative to the background is larger than the contrast of other, non-highlighted, red blood cells relative to the background. In order to achieve such a difference in contrast, the step of highlighting the found red blood cells in the image may comprise, for each red blood cell which is not classified into the at least one group indicated by the first user input, decreasing the contrast of the image in a portion inside the segmentation of the red blood cell relative to a background of the image, wherein the background of the image is formed of those parts of the image where no red blood cells are depicted. In this way the red blood cells which are not classified into the at least one group indicated by the first user input are bleached relative to the red blood cells which are indicated by the first user input.

The step of decreasing the contrast of the image in a portion inside the segmentation of the red blood cell may comprise: setting the intensity of the image in the portion inside the segmentation of the red blood cell to a combination of an original intensity of the image in the portion inside the segmentation of the red blood cell and an intensity of the background of the image. This is an efficient way of bleaching cells. Further, the non-highlighted red blood cells will still be distinguishable from the background. The combination may for example be a mean value or a weighted mean value.

The inventive graphical user interface may further allow the red blood cells in the sub-views of the second view to be sorted. In one embodiment the red blood cells may be sorted with respect to a confidence level of the classification. For this purpose the red blood cell data may further comprise, for each red blood cell in the image, a confidence of the classification of the red blood cell into at least one group, and the step of generating a second view of the graphical user interface further comprises, for each of the at least one group indicated by the first user input, sorting the extracted red blood cells with respect to the confidence of the classification of the red blood cells into the group. In this way the user of the input may easily find those red blood cells for which the automatic classification was uncertain and which may have to be manually re-classified.

In some cases the image depicting the sample of red blood cells is composed of a plurality of sub-images. The sub-images may have a small overlap. In such cases the step of receiving an image depicting a sample of red blood cells may comprise receiving a plurality of images, the union of which depicts the sample of red blood cells, wherein the red blood cell data further comprises, for each red blood cell in the images, an identification of an image of the plurality of images in which the red blood cell is depicted, and wherein the step of displaying the image with highlighted red blood cells comprises displaying the union of the plurality of images with highlighted red blood cells. By having a plurality of sub-images it is possible to get a better resolution in the composed image. More specifically, the resolution of an image is not only limited by the number of pixels of the image but it is also limited by the magnification factor applied when acquiring the image. In order to improve the resolution it is thus advantageous to increase the magnification factor. Doing so, it may be necessary to acquire a plurality of sub-images in order to cover the full area of the sample.

As described above, the red blood cells are classified into different groups with respect to different properties. This means that a particular red blood cell may be sorted into several groups with respect to different properties. In the second view the red blood cells are displayed group-wise. However, it may be of interest to get a simultaneous view of the cells that are classified into two different groups. For this purpose the method may comprise: including in a sub-view of the second view corresponding to a third group a graphical marking of the extracted red blood cells that also are classified into a fourth group, wherein the third and the fourth group are associated with different properties of red blood cells.

According to a second aspect of the invention, the above object is achieved by an apparatus for generating a graphical user interface for analysis of red blood cells, comprising: a receiving component configured to receive an image depicting a sample of red blood cells, and red blood cell data comprising, for each red blood cell in the image, a segmentation and a position of the red blood cell in the image, and a classification of the red blood cell into at least one group with respect to at least one property of red blood cells; a user input component configured to receive a first user input indicating at least one group into which the red blood cells in the image have been classified; a processing unit configured to generate a first view of the graphical user interface by: finding all red blood cells in the red blood cell data which are classified into the at least one group indicated by the first user input, highlighting the found red blood cells in the image, and displaying the image with highlighted red blood cells in the first view; the processing unit being further configured to generate a second view of the graphical user interface by, for each of the at least one group indicated by the first user input: finding all red blood cells in the red blood cell data that are classified into that group, extracting each of the red blood cells that are classified into that group from the image by extracting image data from the image falling within the segmentation of each of the red blood cells that are classified into that group, and displaying the extracted red blood cells in a sub-view of the second view that corresponds to that group.

According to a third aspect, the above object is achieved by a graphical user interface for analysis of red blood cells, comprising: a receiving interface configured to receive an image depicting a sample of red blood cells, and red blood cell data comprising, for each red blood cell in the image, a segmentation and a position of the red blood cell in the image, and a classification of the red blood cell into at least one group with respect to at least one property of red blood cells, a user input interface configured to receive a first user input indicating at least one group into which the red blood cells in the image have been classified; a first view which has been generated by: finding all red blood cells in the red blood cell data which are classified into the at least one group indicated by the first user input, highlighting the found red blood cells in the image, and displaying the image with highlighted red blood cells in the first view; and a second view which has been generated by, for each of the at least one group indicated by the first user input: finding all red blood cells in the red blood cell data that are classified into that group, extracting each of the red blood cells that are classified into that group from the image by extracting image data from the image falling within the segmentation of each of the red blood cells that are classified into that group, and displaying the extracted red blood cells in a sub-view of the second view that corresponds to that group.

According to a fourth aspect, the above object is achieved by a computer-readable medium comprising computer code instructions adapted to carry out the method of the first aspect when executed in a device having processing capabilities.

According to a fifth aspect, the above object is achieved by a system for generating a graphical user interface for analysis of red blood cells. The system comprises: a depicting device arranged to depict a sample of red blood cells; a display; and an apparatus for generating a graphical user interface according to claim 13, the apparatus being connected to the depicting device and the display, wherein the apparatus is arranged to receive an image depicting a sample of red blood cells from the depicting device and to display the graphical user interface on the display. The depicting device may be for example be a microscope which is arranged to acquire images of the sample of red blood cells.

The second, third, fourth and fifth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [image, step etc.]" are to be interpreted openly as referring to at least one instance of said image, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1:
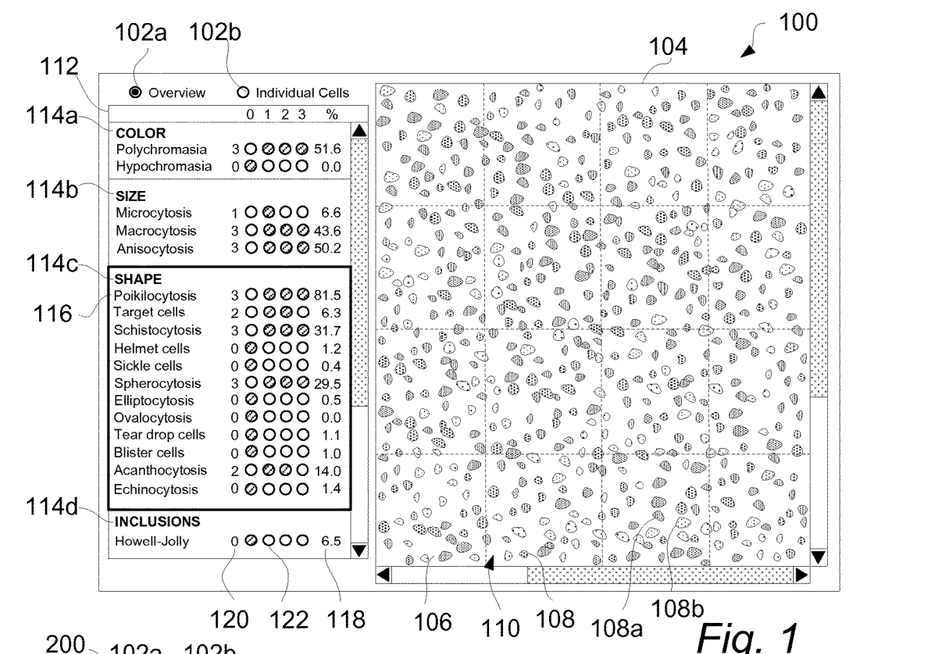
FIG. 1 is a schematic illustration of a first view of a graphical user interface according to embodiments.
Figure 2:
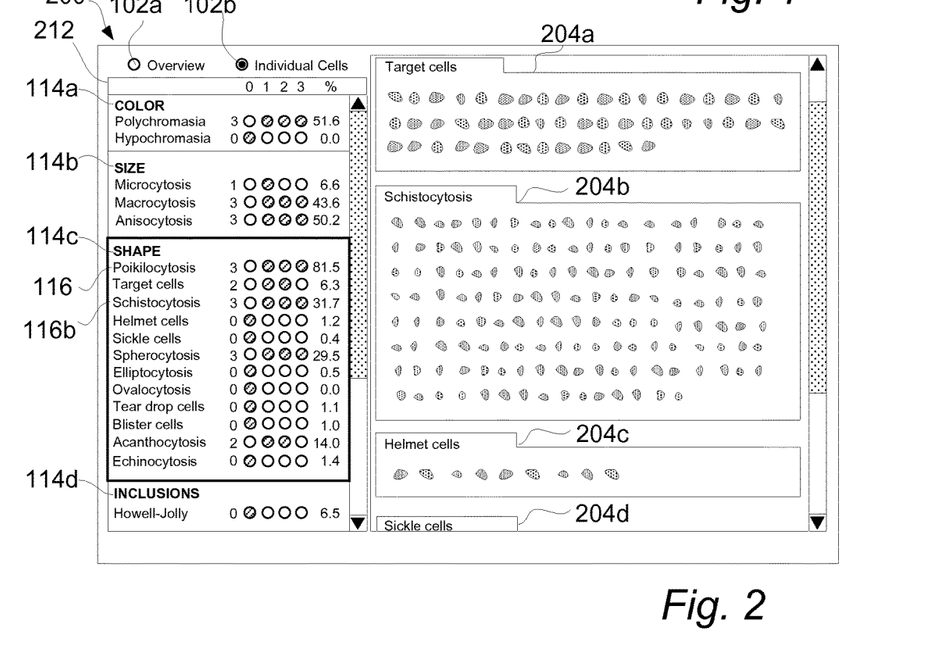
FIG. 2 is a schematic illustration of a second view of a graphical user interface according to embodiments.

FIG. 1 and FIG. 2 illustrate a first view 100 and a second view 200, respectively, of a graphical user interface. The graphical user interface comprises a receiving interface for receiving data to be shown in the interface. A user of the interface may switch between the first view 100 and the second view 200, for example by using toggle buttons 102a and 102b, or by any similar means such as via tabs or menus.

The first view 100 is intended to give an overview of red blood cells in a sample. For this purpose, the first view 100 is configured to display an image 106 depicting a sample of red blood cells 108. For example, the image 106 may be displayed in a sub-view 104 of the first view 100. The image 106 comprises foreground which includes the red blood cells 108 depicted in the image 106, and background 110 which is formed of those parts of the image 106 where no red blood cells 108 are depicted.

The image 106 may be composed of a plurality of images (being indicated in FIG. 1 by the dashed lines) which each depicts a portion of the sample of red blood cells 108. The plurality of images may be stitched together such that the union of the plurality of images forms the image 106 depicting the sample of red blood cells 108. For example, the methods described in WO2002084368 A1, in particular on pages 21-26, may be used.

As will be described in more detail below, some of the red blood cells 108 are highlighted in the image 106, meaning that they are displayed with a higher contrast relative to the background 108 than other cells which are not highlighted. In the illustrated example, the red blood cell 108a is highlighted whereas the red blood cell 108b is not.

The illustrated first view 100 further comprises a sub-view 112 configured to display a list of properties 114a-d of red blood cells. Here, the listed properties 114a-d are color 114a of the red blood cells, size 114b of the red blood cells, shape 114c of the red blood cells, and inclusions 114d of the red blood cells. However, other choices of properties are of course possible.

Each property 114a-d is associated with one or more groups 116. The groups 116 reflect different aspects of the associated property 114a-d. To exemplify, the property "shape" 114c may be associated with groups 116 that reflect different shapes that a red blood cell 108 may have. Here the property "shape" 114c is associated with the groups "poikilocytosis", "target cells", "schistocytosis", "helmet cells", "sickle cells", "spherocytosis", "elliptocytosis", "ovalocytosis", "tear drop cells", "blister cells", "acanthocytosis", and "echinocytosis".

The cells 108 in the image 106 are associated with one or more of the properties 114a-d. More specifically, the cells 108 in the image 106 have been classified into at least one group 116 with respect to at least one of the properties 114a-d. For example, a particular red blood cell 108 may be classified into the group "polychromasia" with respect to the property "color" 114a, and into the group "schistocytosis" with respect to the property "shape" 114c.

The sub-view 112 may further indicate the percentage 118 of red blood cells 108 in the image 106 that have been classified into the different groups 116. In the present example, 51.6% of the red blood cells in the image 106 have been classified into the group "polychromasia" with respect to the "color" property 114a. Additionally, or alternatively, the sub-view 112 may be configured to display a rating 120 indicating the portion of red blood cells 108 being classified into a certain group 116. In the illustrated example, the sub-view 112 is configured to display four ratings corresponding to ratings 0, 1, 2, 3. The ratings 120 may further be graphically indicated, for example using graphical symbols 122.

The first view 100 is configured to receive user input. For example, a user may indicate a property 114a-d displayed in the sub-view 112. The indication may for example be given by a user by clicking on the name of a property 14a-d in the sub-view 112 using a mouse or via a touch screen. In the present example, a user input indicating the property "shape" 114c has been indicated. By indicating a property 114a-d, all groups 116 associated with the indicated property 114a-d are automatically indicated. In a similar fashion, a user may indicate one or more of the groups 116. As will be discussed in more detail later on, the red blood cells 108a that are classified into the groups indicated via a user input are highlighted in the image 106.

The second view 200 is intended to give an overview of the groups 116 of the individual blood cells 108 in the sample. For this purpose, the second view 200 comprises sub-views 204a-d which each corresponds to one of the groups 116. In the illustrated example, sub-view 204a corresponds to the group "target cells", sub-view 204b corresponds to the group "schistocytosis", sub-view 204c corresponds to the group "helmet cells", and sub-view 204d corresponds to the group "sickle cells". A user may see more sub-views by performing a scrolling operation.

In particular, the sub-views 204a-d corresponds to the groups 116 that have been indicated via a user input. In the present example, all groups 116 being associated with the property "shape" 114c have been indicated via a user input and hence the sub-views 204a-d corresponds to the groups 116 being associated with the "shape" property 114c. Accordingly, if another one of the properties 114a-d or if other groups 116 had been indicated by a user input, the second view 200 would comprise sub-views corresponding to those indicated groups.

The second view 200 may further comprise a sub-view 212 which correspond to the sub-view 112 described with reference to FIG. 1.

Figure 3:
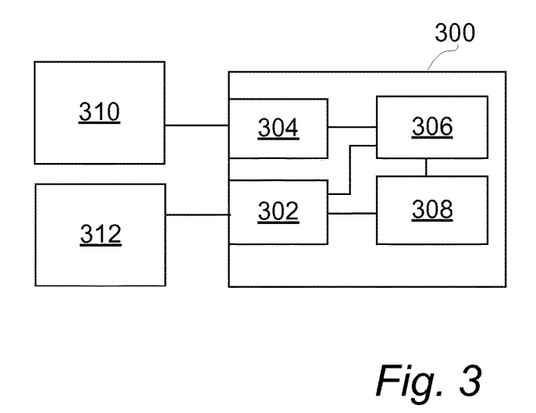
FIG. 3 is a schematic illustration of an apparatus according to embodiments.

FIG. 3 illustrates a system for generating a graphical user interface for analysis of red blood cells, such as the graphical user interface described with reference to FIG. 1 and FIG. 2. The system comprises a depicting device 312, an apparatus 300 for generating a graphical user interface, and a display 310. The depicting device 312, the apparatus 300 and the display 310 may be formed as separate units or as a single unit. In particular, the apparatus 300 and the display 310 may form part of a common unit. The depicting device 312 may generally be any device which is arranged to acquire images of samples of red blood cells. For example, the depicting device may be a microscope with a camera.

The apparatus 300, which may be implemented in software or hardware or a combination thereof, comprises a receiving component 302, a user input component 304, and a processing unit 306, such as a central processing unit. The receiving component 302 is arranged to receive images of samples of red blood cells. For example, the receiving component 302 may receive such images from the depicting device 312 which is arranged to acquire images of samples of red blood cells. The user input component 304 may for example be a computer mouse or similar means allowing a user to make indications and selections via the graphical user interface according to embodiments of the invention. The apparatus 300 may further comprise a memory 308. The memory 308 may store different kinds of data, such as images depicting red blood cells and data relating to red blood cells. Further, the memory may comprise computer code instructions for carrying out any method disclosed herein when executed by the processing unit 306

Figure 7:
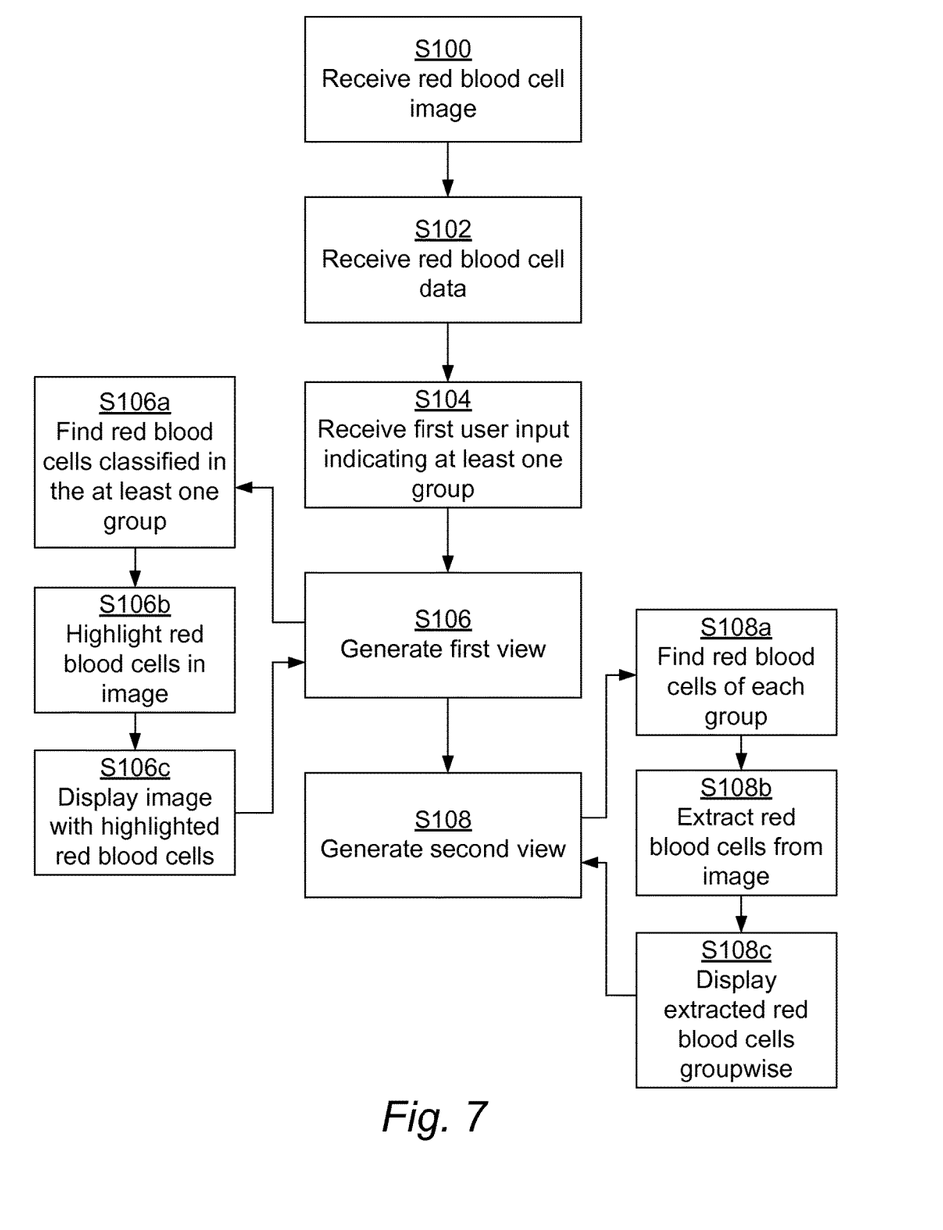
FIG. 7 is a flowchart of a method for generating a graphical user interface according to embodiments.

The operation of the apparatus 300 will now be described with reference to FIG. 1 and FIG. 2 and the flowchart of FIG. 7.

The apparatus 300, in step S100, receives an image 106 depicting a sample of red blood cells 108. The image 106 may for instance be received by the receiving component 302 from the memory 308 or from the depicting device 312 which is arranged to acquire images of samples of red blood cells. In case the image 106 is composed of a plurality of images (as described with reference to FIG. 1) the apparatus 300 may in step S100 receive the plurality of images.

The apparatus 300, in step S102, receives red blood cell data. The red blood cell data may for example be received by the receiving component 302 from the memory 308, the depicting device 312, or from an external database (not shown).

The red blood cell data comprises information relating to the red blood cells 108 in the image 106. The red blood cell data may be in the form of a data structure, such as a vector, which for each red blood cell 108 in the image 106 comprises a number of data elements.

In particular, the red blood cell data may comprise data elements indicating the position of the red blood cells 108 in the image 106. In this way, the red blood cell data allows each red blood cell 108 to be identified with a position in the image 106. In case the image 106 is composed of a plurality of images, the red blood cell data may, for each red blood cell 108, further comprise an identification of the image in which the red blood cell is located. The red blood cell data may further comprise data elements indicating a segmentation of each of the red blood cells 108. The segmentation may for example be in the form of contours, i.e. outer peripheries, of the red blood cells 108 in the image 106. Alternatively, the segmentation may be in the form of masks which identifies the pixels in the image 106 belonging to the red blood cells 108. In this way, the red blood cell data identifies the spatial extent and the shape of each red blood cell 108 in the image 106. As will be described in more detail below, the positional and the segmentation data allows the processing unit 306 to highlight individual red blood cells 108 when generating the first view 100, and to extract individual red blood cells 108 from the image 106 when generating the second view 200.

The red blood cell data, and in particular the positional and segmentation data, may be the output of a segmentation algorithm which has identified and segmented out individual red blood cells 108 from the image 106. For example, the processing unit 306 or the depicting device 312 may previously have run such a segmentation algorithm in order to store red blood cell data to be read by the apparatus 300 when performing step S102. Any suitable segmentation algorithm known in the art may be used for this purpose. Preferably, however, a segmentation algorithm which is based on edge detection is used.

The red blood cell data may further comprise data elements which, for each red blood cell 108 in the image 106, indicates the values of some properties of the image region depicting the blood cell. For example, this can include the area of the image region or information about the average color of the region.

The red blood cell data may further comprise data elements which, for each red blood cell 108, provide a classification of the red blood cell 108 into at least one group 116 with respect to at least one property 114a-d of red blood cells. The groups 116 presented in the first and second views 100 and 200 are thus groups into which the red blood cells 108 may have been classified. For example, a particular red blood cell 108 may be classified as a microcyte, i.e. into the group "microcytosis", with respect to the property "size" 114b and as a schistocyte, i.e. into the group "schistocytosis", with respect to the property "shape" 114c.

The classification may be the output of a classification algorithm, such as a neural network, which has classified the individual red blood cells 108 into different groups. For this purpose, the classification algorithm may make use of the segmentation data being the output from the above mentioned segmentation algorithm. The classification algorithm has typically been trained on red blood cells for which a manual classification is available. By performing such training, the parameters of the classification algorithm are estimated and may be used to classify red blood cells for which no manual classification exists, such as the red blood cells 108 in the image 106. For example, the processing unit 306 or the depicting device 312 may previously have run such a classification algorithm in order to store red blood cell data to be read by the apparatus 300 when performing step S102.

The red blood cell data may further comprise data elements relating to a level of confidence for each classification. The level of confidence provides a measure of the accuracy of the classification. For example, the confidence may be a number between zero and one describing the propability that the classification is correct. More general, the confidence may be a number in any interval.

The apparatus 300, in step S104, receives a user input indicating at least one of the groups 116. The user input may be received via the user input component 304. The user may indicate at least one of the groups 116 by for example using a mouse or any other similar means to select a group 116 by clicking on the group 116 in any of the sub-views 112 or 212 of the first and the second view 100 and 200, respectively. In this way the sub-views 112 and 212 serve as a user input interface of the graphical user interface. The user input may indicate a property 114a-d of red blood cells, such as the property "shape" 114c as illustrated in FIG. 1. By indicating a property 114a-d, the user input indicates all groups being associated with that property 114a-d. In response to receiving the user input, the processing unit 306 may highlight the indicated at least one group in the first and the second views 100 and 200.

When the apparatus 300 has received the image 106 and the red blood cell data, it proceeds to generate, in step S106, the first view 100 and, in step S108, the second view 200.

In order to generate the first view 100, and in particular the sub-view 104 of the first view 100, the processing unit 306 carries out a number of sub-steps S106a-c.

In step S106a, the processing unit 306 analyzes the red blood cell data to find all red blood cells 108 which are classified into the at least one group 116 indicated by the user input. For this purpose, the processing unit 306 may search the red blood cell data to find data elements corresponding to the at least one group 116 which has been indicated. For the found data elements, the processing unit 306 may identify the identity of the corresponding red blood cells 108. In the illustrated example of FIG. 1, the user input has indicated all groups 116 being associated with the property "shape" 114c. The processing unit 306 thus identifies, by using the red blood cell data, all red blood cells 108 in the image 106 that have been classified into one of the groups 116 being associated with the property "shape" 114c.

In step S106b, the processing unit 306 highlights in the image 106 the red blood cells 108 found in step S106a. In general, highlighting of a red blood cell 108a means that its contrast relative to the background 110 is made larger than the contrast relative to the background 110 of a red blood cell 108b which is not highlighted. There are many possibilities for how to perform such a highlighting. According to a first option, the contrast relative to the background 110 of the red blood cell 108a to be highlighted may be increased while the contrast relative to the background or the red blood cells 108b which should not be highlighted may be kept constant. According to a second option, the contrast relative to the background 110 of the red blood cells 108b which should not be highlighted may be decreased while the contrast relative to the background or the red blood cells 108a to be highlighted may be kept constant. In this way, the red blood cells 108a is highlighted since the other red blood cells 108b are "bleached" meaning that they will be less distinguishable from the background. According to a third option, the contrast relative to the background 110 of the red blood cells 108b which should not be highlighted may be decreased while the contrast relative to the background or the red blood cells 108a to be highlighted may be increased.

Since the red blood cells to be analyzed by the user typically are those that have been indicated by the user input, it is preferred to not modify the appearance of those cells in the image 106. Thus, the preferred option is the second option above, where the non-highlighted red blood cells, such as the red blood cell 108b, are bleached. In more detail, the processing unit 306 may bleach a red blood cell 108b by setting the intensity of the image 106 in the portion inside the red blood cell 108b as defined by the segmentation to a combination of the intensity of the image 106 in the portion inside the the red blood cell 108b and the intensity of the background 110. The intensity of the background 110 may be a mean intensity of the background 110. For example, the combination may be a mean value, a weighted mean value, or any other layer blending method known in the art. In this way, the contrast between the red blood cell 108b and the background 110 decreases and hence the red blood cell 108b is bleached.

In step S106c, the processing unit 306 displays the image 106 with highlighted red blood cells 108a in the first view 100. For example the processing unit 306 may display the image in the sub-view 104 of the first view 100. The first view 100, and thereby also the sub-view 104, may for example be displayed on the display 310.

It is to be understood that in case the image 106 is composed of a plurality of images, the steps S106a-c may be performed for each of the plurality of images. In the last step S106c, the processing unit 306 will then combine, i.e. stitch together, the plurality of images to form the image 106 having highlighted red blood cells.

In order to generate the second view 200, and in particular the sub-views 204a-d of the second view 100, the processing unit 306 carries out a number of sub-steps S108a-c. As described above, each of the sub-views 204a-d corresponds to one of the groups 116 that has been indicated by the user input. In this example the groups associated with the property "shape" 114c have been indicated by the user input. The processing unit 306 carries out the steps S108a-c for each of the groups 116 that have been indicated by the user input, in order to generate each of the sub-views 204a-d. In the following the steps S108a-c will be explained with respect to one of the indicated groups, namely to the group "schistocytosis" 116b corresponding to the sub-view 204b.

In step S108a the processing unit 306 finds all red blood cells in the red blood cell data that are classified into the group 116b, here the group "schistocytosis". In order to do so, the processing unit 306 may proceed in the same manner as explained with reference to step S106a.

In step S108b, the processing unit 306 extracts each of the red blood cells 108 that, according to the red blood cell data, are classified into the group 116b. By extracting a red blood cell, such as the red blood cell 108a, is generally meant that the red blood cell is cut out of the image 106. More particularly, in order to extract a red blood cell 108 the processing unit 306 may extract a portion of the image 106 falling within the segmentation, such as within the contour, of the red blood cell 108a as given by the red blood cell data.

When all red blood cells which are classified into the group 116b have been extracted from the image 106, the processing unit 306 proceeds to display the extracted red blood cells in the sub-view 204b corresponding to the group 116b. As illustrated in FIG. 2 the extracted red blood cells are shown side-by side in the sub-view 204b.

The processing unit 306 then repeats steps S108a-c until sub-views 204a-d have been generated for all groups that were indicated by the user input. It is to be understood that in case the image 106 is composed of a plurality of images, the steps S108a-c may be performed for each of the plurality of images.

The processing unit 306 may further sort the extracted red blood cells within each of the sub-views 204a-d with respect to different parameters. Such sorting may be performed in response to a further user input. For example, in case the red blood cell data comprises confidence levels of the classification into the groups 116, the processing unit 306 may sort the extracted red blood cells for a particular group, such as group 116b, with respect to the confidence level. The sorting may be performed in order of increasing or in order of decreasing confidence level. According to another example, the extracted red blood cells corresponding to a group 116b being associated with a first property, here "shape" 114c, may be sorted with respect to a second property such as "size" 114b.

As a result of the above disclosed method, there is a graphical user interface having a first 100 and a second view 200. In the second view 200 a user of the interface may easily analyze the individual red blood cells group-wise via the sub-views 204a-d. At the same time, the user may via the first view 100 see the spatial distribution in the sample of the red blood cells of the groups corresponding to the sub-views 204a-d. In this way a user has a chance to detect whether the reasons for a certain result of the analysis of the red blood cells in the second view is due to a certain spatial distribution of the red blood cells in the sample. For example, if the red blood cells of a certain group are non-uniformly distributed in the sample this may imply that the sample was not properly prepared. Also, if the first view 100 reveals that red blood cells of a certain group tend to form clusters this may point to a certain diagnosis which cannot be detected by only studying the extracted red blood cells on an individual basis in the second view 200.

Figure 4:
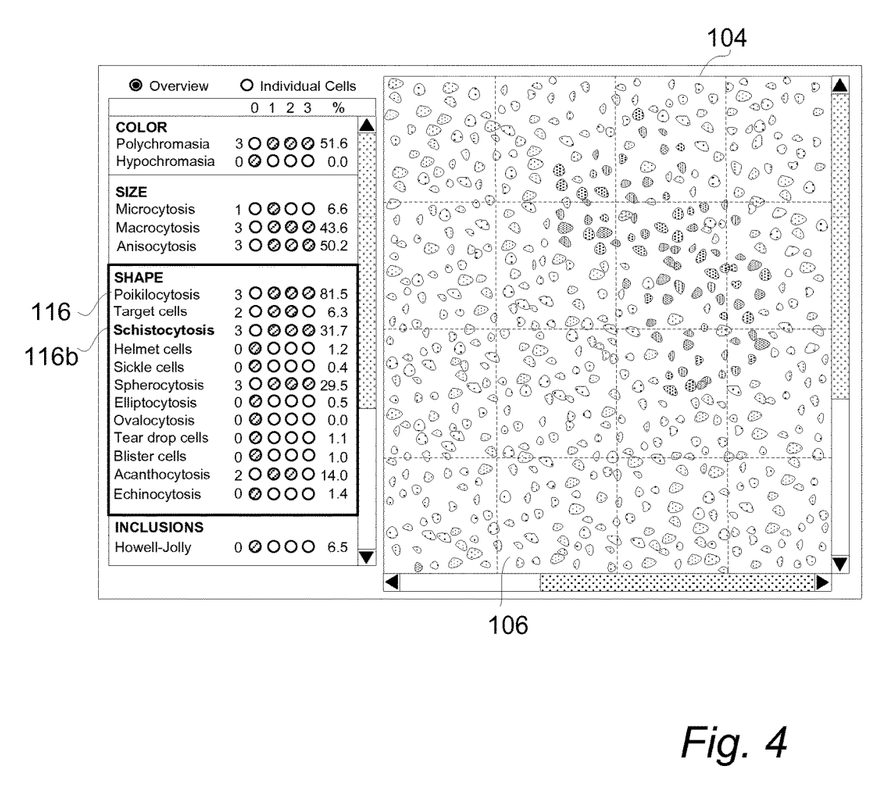
FIG. 4 is a schematic illustration of a first view of a graphical user interface according to embodiments.

The processing unit 306 may receive further user inputs. For example, the processing unit 306 may receive via the first view 100 or the second view 200 a further user input which indicates a selected group of the a at least one group indicated by the first user input. This is further illustrated in FIG. 4 which illustrates the first view 100. In this example, the processing unit 306 has received a first user input indicating all groups 116 being associated with the property "shape" 114c. Moreover, the processing unit 306 receives a further user input selecting the group "schistocytosis" 116b. In response to receiving the further user input, the processing unit 306 updates the image 106 displayed in the sub-view 104. In more detail, the processing unit 306 proceeds to highlight only those red blood cells that, according to the red blood cell data, are classified into the group "schistocytosis" 116b. For example, and as further discussed above, this may include bleaching all red blood cells that are not classified into the group "schistocytosis" 116b. In the present example, the updated image 106 reveals that the red blood cells of the groups "schistocytosis" seems to cluster in a certain portion of the sample.

Along similar lines, the processing unit 306 may receive a further user input via the second view 200 indicating one or more particular red blood cells to be highlighted. Typically, a user may indicate one or more particular red blood cell by making a selection in one or more of the sub-views 204a-d of the second view 200. In response to receiving the further user input, the processing unit 306 may proceed to update the first image 106 to only highlight the selected one or more red blood cells. For example, the processing unit 306 may proceed to bleach all but the selected red blood cells in the image 106.

In some embodiments the processing unit 306 may receive a further user input indicating a selected group to be removed from being highlighted. In response to receiving such a further input the processing unit 306 may update the image 106 of the first view 100 to remove the highlighting of the red blood cells of the selected group. For example the removal of the highlighting of the concerned red blood cells may be performed by bleaching the concerned red blood cells as previously described. This embodiment is particularly useful for a user that analyses the red blood cells in the second view 200. Once the analysis of a particular group corresponding to a sub-view 204a-d has been completed, the highlighting of that particular group may be removed from the first view 100. The user may then double-check that the analysis of all groups is completed when no red blood cells are highlighted in the first view 100.

Figure 5:
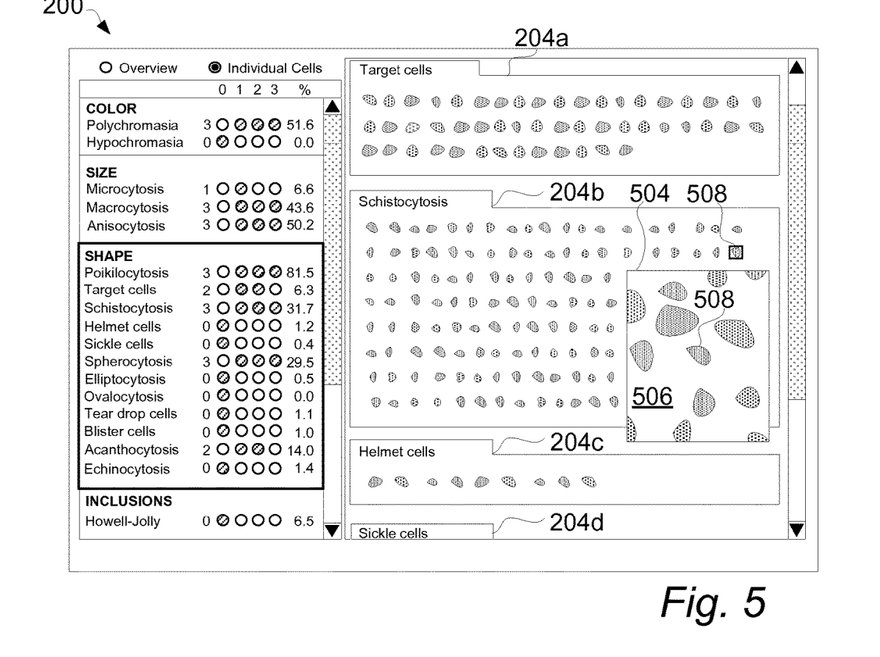
FIG. 5 is a schematic illustration of a second view of a graphical user interface according to embodiments.

FIG. 5 illustrates another functionality of the user interface. More specifically, FIG. 5 shows the second view 200 of the graphical user interface. The processing unit 306 may receive a further user input indicating a selected red blood cell 508 from one of the sub-views 204a-d. Upon receiving the further user input, the processing unit 306 may search in the red blood cell data to find the position of the selected red blood cell 508. Upon finding the position, the processing unit 306 may extract a portion 506 of the image 106 that corresponds to an area that includes the selected red blood cell 508. The processing unit 306 may then proceed to increase the magnification level of the extracted portion 506, that is, to zoom in on the selected red blood cell 508. The processing unit 306 may then display the extracted portion 506 in a sub-view 504 of the second view 200.

Figure 6:
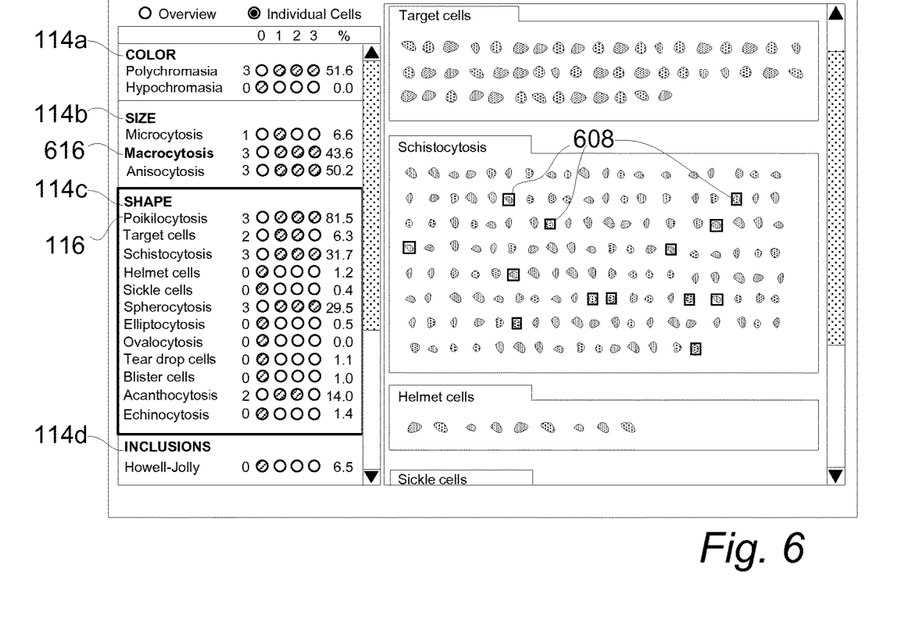
FIG. 6 is a schematic illustration of a second view of a graphical user interface according to embodiments.

FIG. 6 illustrates yet another functionality of the user interface. FIG. 6 shows the second view 200 of the graphical user interface. As discussed before, the second view 200 comprises sub-views 204a-d which in the present example corresponds to the groups 116 being associated with the property "shape" 114c. In particular, the sub-view 204b corresponds to the group "schistocytosis". The processing unit 306 may receive a user input indicating a further group 616, here the group "macrocytosis", apart from the groups 116 corresponding to the sub-views 204a-d. The further group 616 is associated with another property, here the property "size" 114c. In response to the further user input, the processing unit 306 may include a graphical marking of the extracted red blood cells in one or more of the sub-views 204a-d. The marking is with respect to those extracted red blood cells in the sub-views 204a-d which also are classified into the further group 616. In this example, the extracted red blood cells 608 which are both classified into the group "schistocytosis" and the group "macrocytosis" are graphically marked. The marking may for example be made by a rectangle surrounding the extracted red blood cells or any other graphical marking which is suitable for the purpose. The possibility to select or mark red blood cells based on two properties simultaneously can give an important diagnostic advantage in some cases. For example, when analysing the cells in the shape group "spherocytes" it is relevant to know whether these cells also fall into the size group "macrocytes" or "normal size".

A user of the graphical user interface disclosed herein may manually reclassify cells. Preferably such reclassification is made via the second view 200. For example, the reclassification may be made by a drag-and-drop operation where the user moves an extracted red blood cell from one of the sub-views 204a-d to another one of the sub-views 204a-d. Upon receiving a user input indicating such a reclassification, the processing unit 306 may update the classification in the red blood cell data with respect to the concerned red blood cell. Also, the processing unit 306 may update the second view to remove the reclassified red blood cell from one of the sub-views 204a-d and to add it to another one of the sub-views 204a-d as indicated by the further user input.

It will be appreciated that a person skilled in the art can modify the above-described embodiments in many ways and still use the advantages of the invention as shown in the embodiments above. For example, there may be other ways of highlighting the red blood cells, the layout of the first view and the second view may be done differently, additional groups may be used for the properties described and additional properties of red blood cells may be analyzed using the invention etc. Thus, the invention should not be limited to the shown embodiments but should only be defined by the appended claims. Additionally, as the skilled person understands, the shown embodiments may be combined.

The invention claimed is:

1. A method for displaying red blood cells in a graphical user interface for analysis of red blood cells, comprising:
   receiving, by a receiving device, an image depicting a sample of red blood cells;
   receiving, by the receiving device, red blood cell data comprising, for each red blood cell in the image,
      a segmentation and a position of the red blood cell in the image, and
      a classification of the red blood cell into at least one group with respect to at least one property of red blood cells;
   receiving, by a user input component, a first user input indicating at least one group into which the red blood cells in the image have been classified;
   generating, with a processing unit, a first view of the graphical user interface by:
      finding all red blood cells in the red blood cell data which are classified into the at least one group indicated by the first user input,
      highlighting only the found red blood cells in the image, and
      displaying the image with highlighted red blood cells in the first view;
   generating, with the processing unit, a second view that is different from the first view of the graphical user interface by, for each of the at least one group indicated by the first user input:
      finding all red blood cells in the red blood cell data that are classified into the at least one group,
      extracting each of the red blood cells that are classified into the at least one group from the image by extracting image data from the image falling within the segmentation of each of the red blood cells that are classified into the at least one group, and
      displaying the extracted red blood cells in a sub-view of the second view that corresponds to the at least one group.

2. The method of claim 1, wherein the first user input indicates a property of red blood cells, thereby indicating all groups being associated with that property.

3. The method of claim 1, further comprising:
   receiving, via a user input component, a second user input indicating a selected group of the at least one group indicated by the first user input; and
   in response thereto, updating the image displayed in the sub-view of the first view to only highlight red blood cells of the selected group.

4. The method of claim 1, further comprising:
   receiving, via a user input component, a third user input indicating one or more selected red blood cells; and
   in response thereto, updating the image displayed in the sub-view of the first view to only highlight the selected one or more red blood cells.

5. The method of claim 1, comprising:
receiving, via a user input component, a third user input indicating a selected red blood cell; and
finding, in the red blood cell data, the position of the selected red blood cell, extracting image data from the image corresponding to an area that includes the selected red blood cell, increasing the magnification level of the extracted image data, and displaying it in a second sub-view of the second view.

6. The method of claim 1, comprising
receiving a fourth user input, via a user input component, indicating a red blood cell in the second view, and for that red blood cell:
updating the classification in the red blood cell data from a first group indicated by the first user input to a second group indicated by the first user input,
updating the second view to display the extracted red blood cell in the sub-view corresponding to the second group instead of in the sub-view corresponding to the first group.

7. The method of claim 1, wherein the step of highlighting the found red blood cells in the image comprises
for each red blood cell which is not classified into the at least one group indicated by the first user input, decreasing the contrast of the image in a portion inside the segmentation of the red blood cell relative to a background of the image, wherein the background of the image is formed of those parts of the image where no red blood cells are depicted.

8. The method of claim 7, wherein the step of decreasing the contrast of the image in a portion inside the segmentation of the red blood cell comprises:
setting the intensity of the image in the portion inside the segmentation of the red blood cell to a combination of an original intensity of the image in the portion inside the segmentation of the red blood cell and an intensity of the background of the image.

9. The method of claim 1, wherein the red blood cell data further comprises, for each red blood cell in the image, a confidence of the classification of the red blood cell into the at least one group, and wherein the step of generating a second view of the graphical user interface further comprises, for each of the at least one group indicated by the first user input, sorting the extracted red blood cells with respect to the confidence of the classification of the red blood cells into the group.

10. The method of claim 1, wherein the step of receiving an image depicting a sample of red blood cells comprises receiving a plurality of images, the union of which depicts the sample of red blood cells, wherein the red blood cell data further comprises, for each red blood cell in the images, an identification of an image of the plurality of images in which the red blood cell is depicted, and wherein the step of displaying the image with highlighted red blood cells comprises displaying the union of the plurality of images with highlighted red blood cells.

11. The method of claim 1, further comprising
including in a sub-view of the second view corresponding to a third group a graphical marking of the extracted red blood cells that also ore classified into a fourth group, wherein the third and the fourth groups are associated with different properties of red blood cells.

12. An apparatus for displaying red blood cells in a graphical user interface for analysis of red blood cells, comprising:
a receiving component configured to receive an image depicting a sample of red blood cells, and red blood cell data comprising, for each red blood cell in the image,
a segmentation and a position of the red blood cell in the image, and
a classification of the red blood cell into at least one group with respect to at least one property of red blood cells;
a user input component configured to receive a first user input indicating at least one group into which the red blood cells in the image have been classified;
a processing unit configured to generate a first view of the graphical user interface by:
finding all red blood cells in the red blood cell data which are classified into the at least one group indicated by the first user input,
highlighting only the found red blood cells in the image, and
displaying the image with highlighted red blood cells in the first view;
the processing unit being further configured to generate a second view that is different from the first view of the graphical user interface by, for each of the at least one group indicated by the first user input:
finding all red blood cells in the red blood cell data that are classified into that group,
extracting each of the red blood cells that are classified into that group from the image by extracting image data from the image falling within the segmentation of each of the red blood cells that are classified into that group, and
displaying the extracted red blood cells in a sub-view of the second view that corresponds to that group.

13. A graphical user interface for analysis of red blood cells, comprising:
a receiving interface configured to receive an image depicting a sample of red blood cells, and red blood cell data comprising, for each red blood cell in the image,
a segmentation and a position of the red blood cell in the image, and
a classification of the red blood cell into at least one group with respect to at least one property of red blood cells,
a user input interface configured to receive a first user input indicating at least one group into which the red blood cells in the image have been classified;
a first view which has been generated by:
finding all red blood cells in the red blood cell data which are classified into the at least one group indicated by the first user input,
highlighting only the found red blood cells in the image, and
displaying the image with highlighted red blood cells in the first view;
a second view that is different from the first view which has been generated by, for each of the at least one group indicated by the first user input:
finding all red blood cells in the red blood cell data that are classified into that group,
extracting each of the red blood cells that are classified into that group from the image by extracting image data from the image falling within the segmentation of each of the red blood cells that are classified into that group, and
displaying the extracted red blood cells in a sub-view of the second view that corresponds to that group.

14. A non-transitory computer-readable medium comprising computer code instructions adapted to carry out the method of claim 1 when executed in a device having processing capabilities.

15. A system for displaying red blood cells in a graphical user interface for analysis of red blood cells, comprising:
- a depicting device arranged to depict a sample of red blood cells;
- a display; and
- an apparatus for generating a graphical user interface according to claim 13, the apparatus being connected to the depicting device and the display, wherein the apparatus is arranged to receive an image depicting a sample of red blood cells from the depicting device and to display the graphical user interface on the display.

* * * * *